United States Patent
Wen et al.

(10) Patent No.: US 11,487,331 B2
(45) Date of Patent: Nov. 1, 2022

(54) ELECTRONIC DEVICE

(71) Applicant: Acer Incorporated, New Taipei (TW)

(72) Inventors: Chun-Hung Wen, New Taipei (TW);
Wei-Chih Wang, New Taipei (TW);
Chi-Tai Ho, New Taipei (TW);
Yu-Cheng Shih, New Taipei (TW);
Hui-Ping Sun, New Taipei (TW);
Chun-Hsien Chen, New Taipei (TW);
Kuan-Lin Chen, New Taipei (TW);
Chih-Heng Tsou, New Taipei (TW);
Yen-Chou Chueh, New Taipei (TW)

(73) Assignee: Acer Incorporated, New Taipei (TW)

( * ) Notice: Subject to any disclaimer, the term of this patent is extended or adjusted under 35 U.S.C. 154(b) by 13 days.

(21) Appl. No.: 17/237,071

(22) Filed: Apr. 22, 2021

(65) Prior Publication Data
US 2021/0240230 A1    Aug. 5, 2021

Related U.S. Application Data

(63) Continuation of application No. 16/856,007, filed on Apr. 22, 2020, now Pat. No. 11,023,015.

(30) Foreign Application Priority Data

Nov. 20, 2019    (TW) ................................ 108142180

(51) Int. Cl.
*G06F 1/16*    (2006.01)
(52) U.S. Cl.
CPC .......... *G06F 1/1679* (2013.01); *G06F 1/1652* (2013.01)

(58) Field of Classification Search
CPC combination set(s) only.
See application file for complete search history.

(56) References Cited

U.S. PATENT DOCUMENTS

| | | | |
|---|---|---|---|
| 9,348,450 B1* | 5/2016 | Kim | G06F 1/1616 |
| 9,477,269 B2* | 10/2016 | Morrison | G06F 1/1616 |
| 9,857,832 B2* | 1/2018 | Kim | G06F 1/1679 |
| 10,225,383 B2* | 3/2019 | Lee | H04M 1/022 |
| 10,321,583 B2* | 6/2019 | Seo | H04N 5/64 |
| 10,890,948 B1* | 1/2021 | Chueh | G06F 1/1681 |
| 2016/0179236 A1* | 6/2016 | Shin | G06F 3/0487 345/173 |
| 2018/0059734 A1* | 3/2018 | Knoppert | G06F 1/1616 |
| 2022/0182476 A1* | 6/2022 | Cha | H04M 1/0247 |
| 2022/0187874 A1* | 6/2022 | Chun | G06F 1/1681 |

* cited by examiner

*Primary Examiner* — Lisa Lea-Edmonds
(74) *Attorney, Agent, or Firm* — JCIPRNET (57) ABSTRACT

An electronic device includes a first body, a second body pivoted to the first body and a magnetic force mechanism. The first body includes a driving portion. The second body includes a casing, a flexible display and a supporting mechanism movably disposed in the casing. The flexible display is attached to the supporting mechanism. The magnetic force mechanism is disposed in the casing, wherein a portion of the magnetic force mechanism is exposed from the casing and abuts against the driving portion. The magnetic force mechanism is magnetically coupled to the supporting mechanism, wherein the magnetic force mechanism generates a magnetic attraction force or a magnetic repulsion force to the supporting mechanism by the second body rotating relative to the first body.

11 Claims, 7 Drawing Sheets

ELECTRONIC DEVICE

CROSS-REFERENCE TO RELATED APPLICATION

This application is a continuation application of and claims the priority benefit of U.S. application Ser. No. 16/856,007, filed on Apr. 22, 2020, now allowed, which claims the priority benefit of Taiwan application serial no. 108142180, filed on Nov. 20, 2019. The entirety of each of the above-mentioned patent applications is hereby incorporated by reference herein and made a part of this specification.

BACKGROUND

Field of the Invention

The invention relates to an electronic device and more particularly, to an electronic device integrated with a flexible display.

Description of Related Art

Since curved-surface displays may provide users with a surround field of vision to achieve a visual immersion effect for the users, some manufacturers have developed notebook computers equipped with curved-surface displays. A commonly used curved-surface display includes a casing and a curved-surface screen. The curved-surface display screen is installed in the casing, and a curvature of the curved-surface display screen is fixed. In order to fit a geometric contour of the curved-surface display screen, a side of the casing which faces toward a machine body is usually designed in an arc shape, however, such design may lead to increased volume, thickness and weight of the casing. In addition, when the curved-surface display is closed to a machine body, there is large gap existing between the casing and the machine body. Thus, most of the notebook computers equipped with the curved-surface displays available on the market suffer from issues, such as great heavyweight and insufficient structural strength.

SUMMARY

The invention provides an electronic device capable of satisfying the requirement for thin and lightweight design of the products.

An electronic device provided by the invention includes a first body, a second body and a magnetic force mechanism. The first body includes a driving portion. The second body is pivoted to the first body. The second body includes a casing, a flexible display and a supporting mechanism. The supporting mechanism is movably disposed in the casing, and the flexible display is attached to the supporting mechanism. The magnetic force mechanism is disposed in the casing, wherein a portion of the magnetic force mechanism is exposed from the casing and abuts against the driving portion. The magnetic force mechanism is magnetically coupled to the supporting mechanism, wherein the magnetic force mechanism generates a magnetic attraction force or a magnetic repulsion force to the supporting mechanism by the second body rotating relative to the first body.

Based on the above, in the electronic device of the invention can generate the magnetic attraction force to the flexible display through the magnetic force mechanism, so as to flatly unfold the flexible display, or alternatively, the electronic device of the invention can generate the magnetic repulsion force to the flexible display through the magnetic force mechanism, so as to bend the flexible display. Since the curvature of the flexible display is not fixed, the casing of the second body can be in accordance with the curvature of the flexible display without having to be designed as an arc structure and can meet the requirement for thin and lightweight design of the products. When the second body is closed to the first body, the second body can be closely attached to the first body, and thus, the issues that an overall thickness is overly great, and a structural strength is insufficient can be prevented from occurring to the electronic device. On the other hand, a force applied by the magnetic force mechanism to the flexible display can be transferred through relative rotation of the second body and the first body. Thus, for a user, the operation of the electronic device of the invention becomes more convenient.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
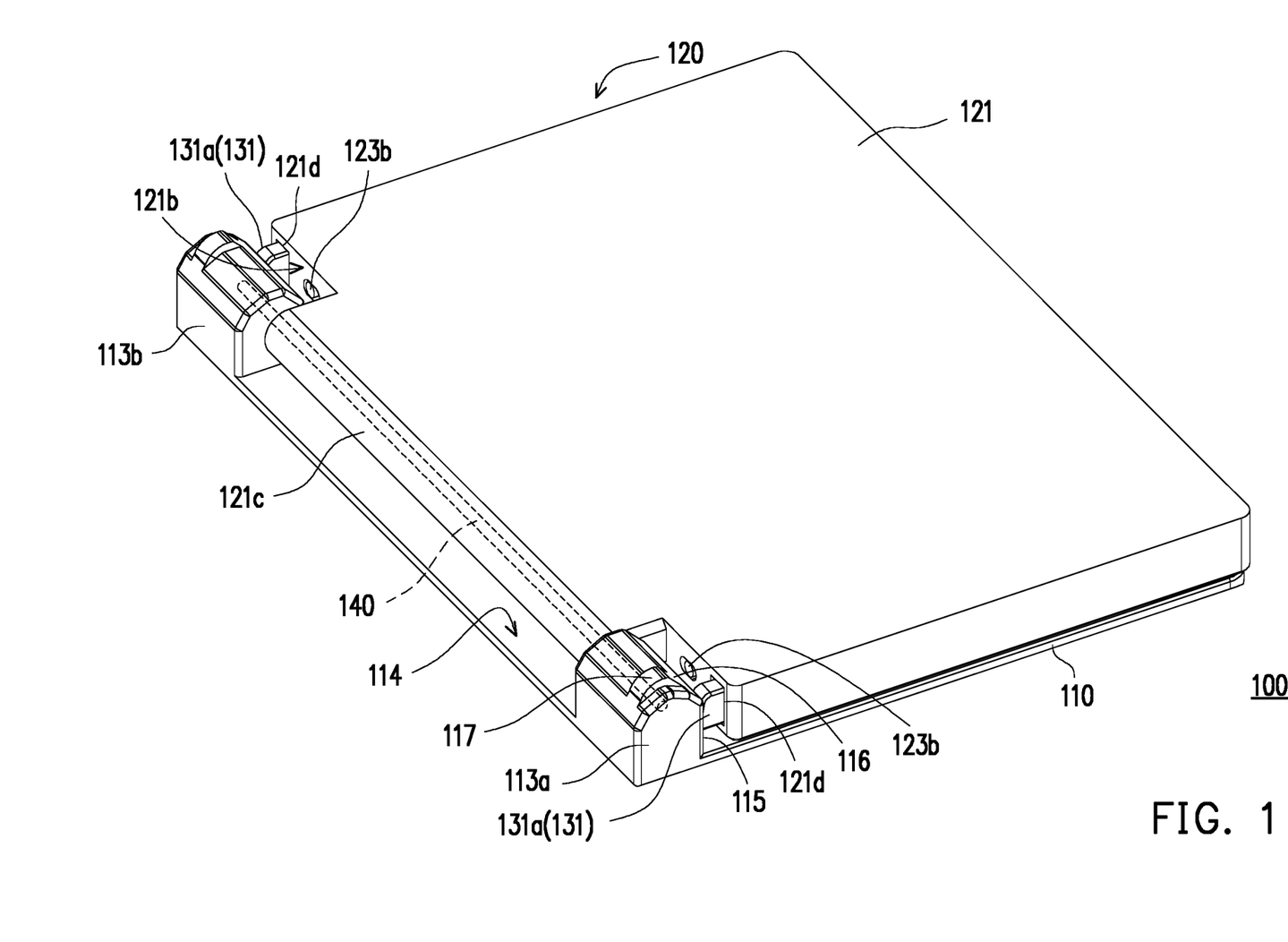
FIG. 1 is a schematic diagram illustrating an electronic device in a first state according to an embodiment of the invention.
Figure 2:
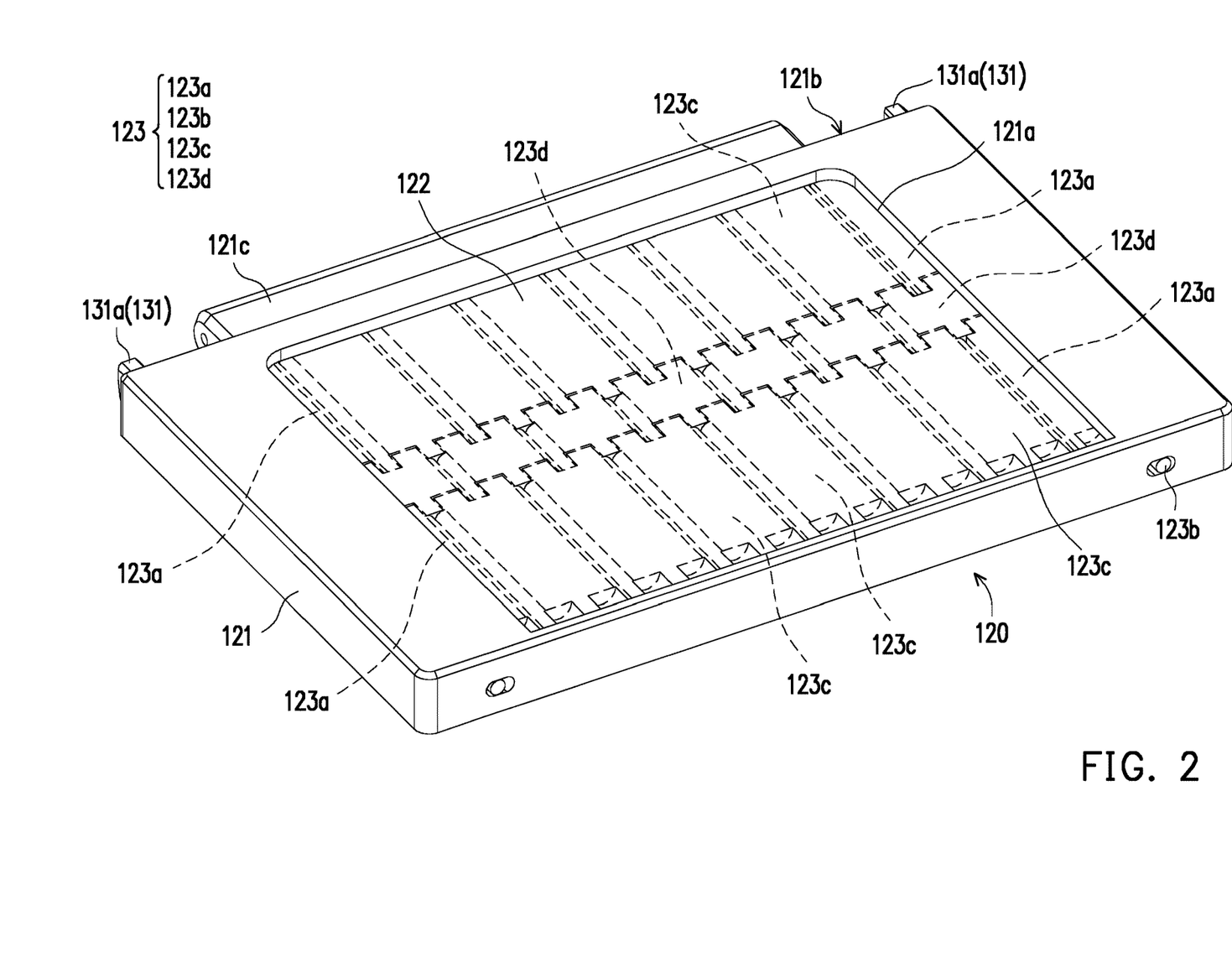
FIG. 2 is a schematic diagram illustrating a second body in the first state according to an embodiment of the invention.
Figure 3:
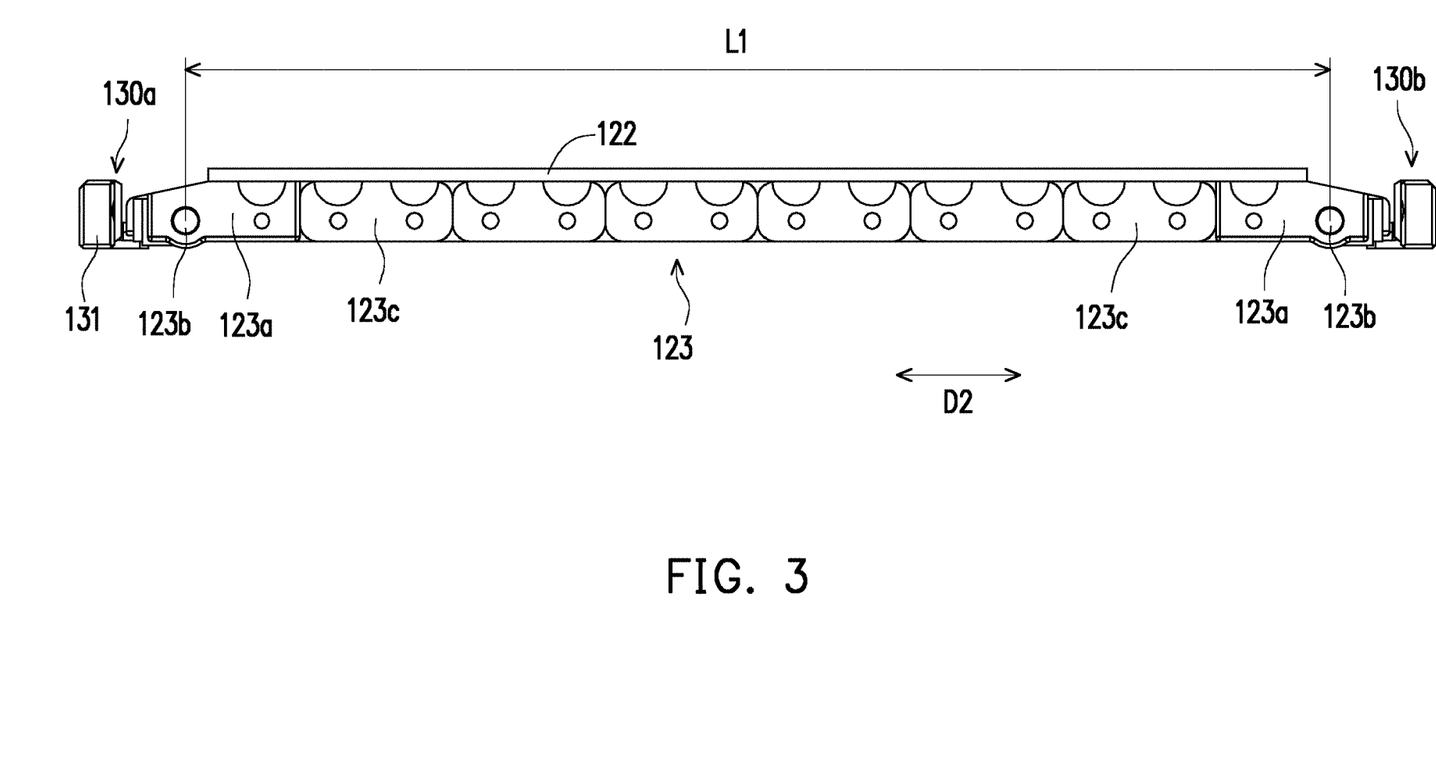
FIG. 3 is a schematic front diagram illustrating a flexible display, a supporting mechanism and magnetic force mechanisms in the first state according to an embodiment of the invention.
Figure 4:
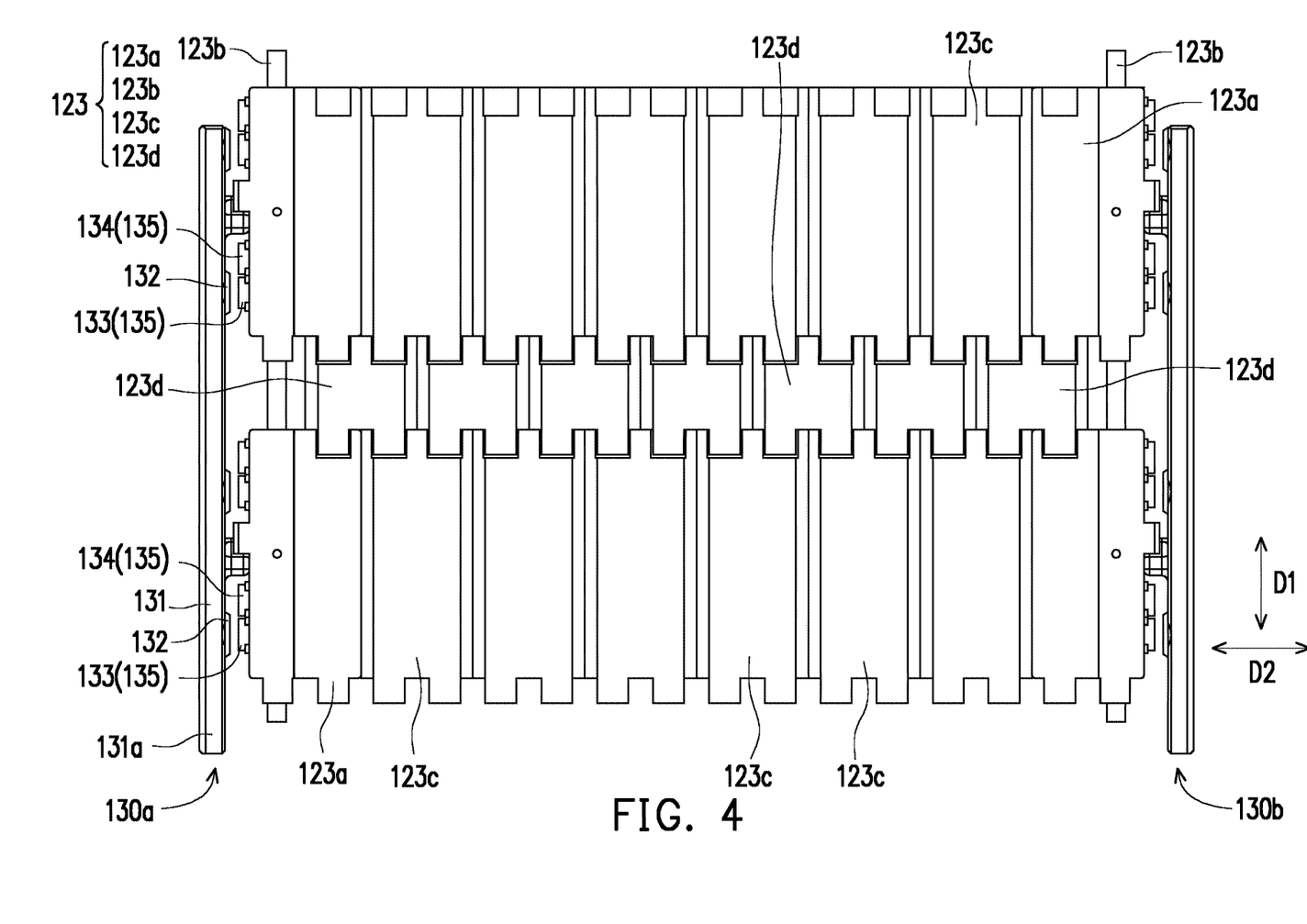
FIG. 4 is a schematic top diagram illustrating the supporting mechanism and the magnetic force mechanisms in the first state according to an embodiment of the invention.
Figure 5:
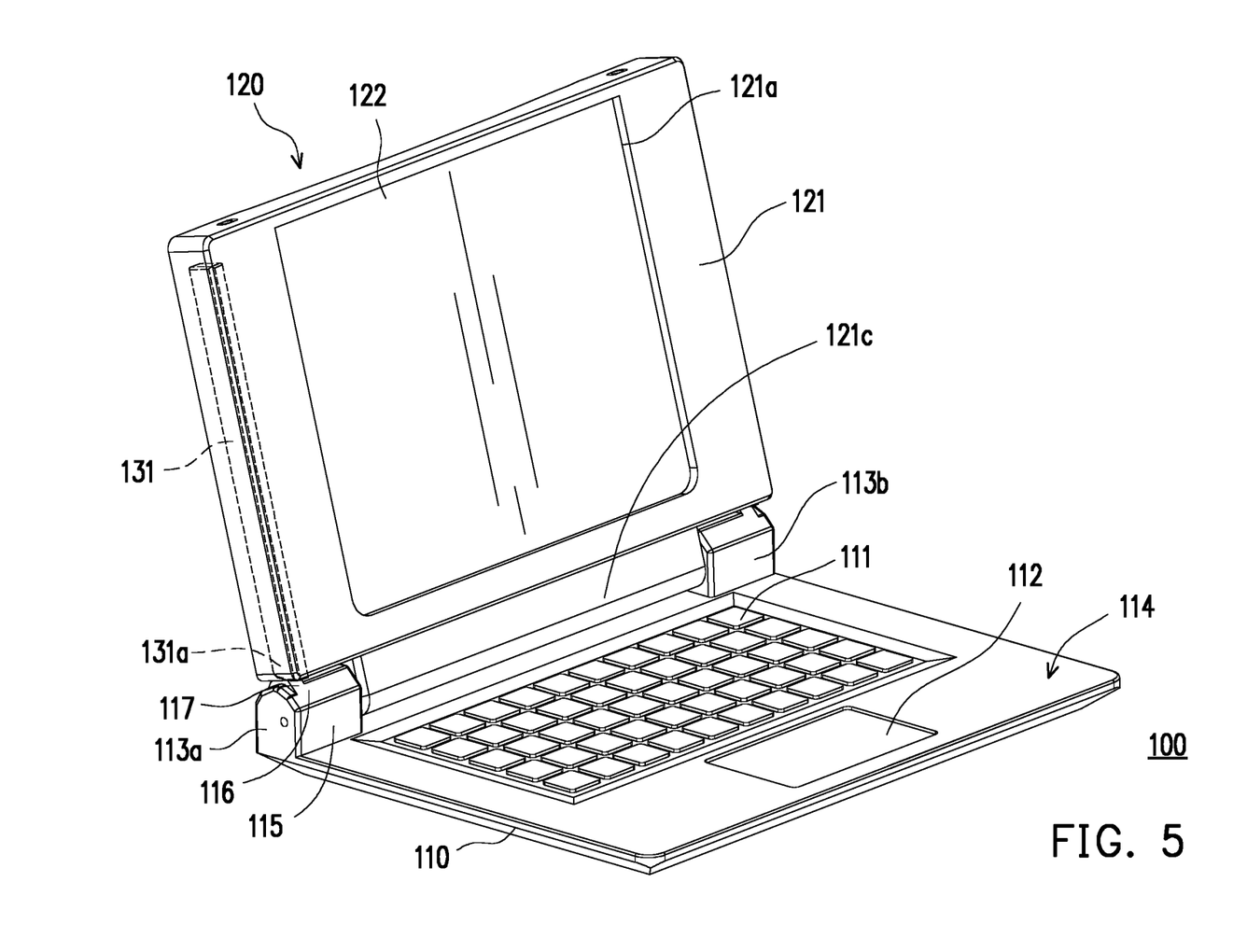
FIG. 5 is a schematic diagram illustrating an electronic device in a second state according to an embodiment of the invention.
Figure 6:
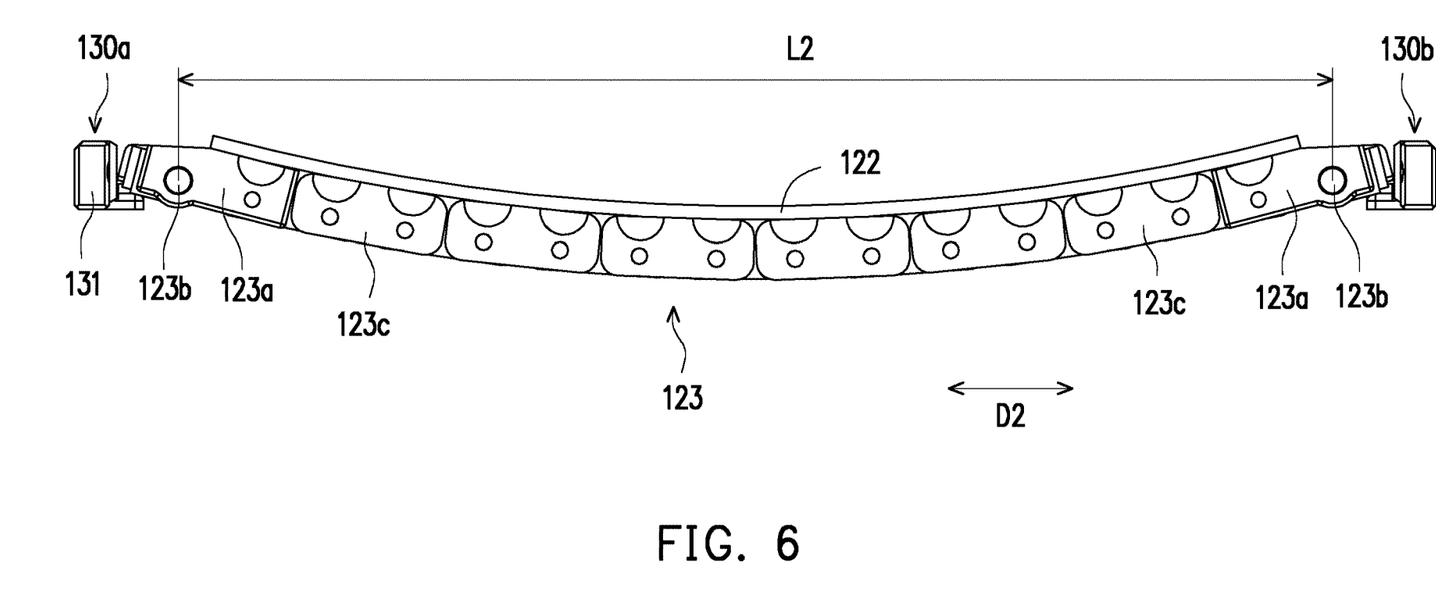
FIG. 6 is a schematic front diagram illustrating the flexible display, the supporting mechanism and the magnetic force mechanisms in the second state according to an embodiment of the invention.
Figure 7:
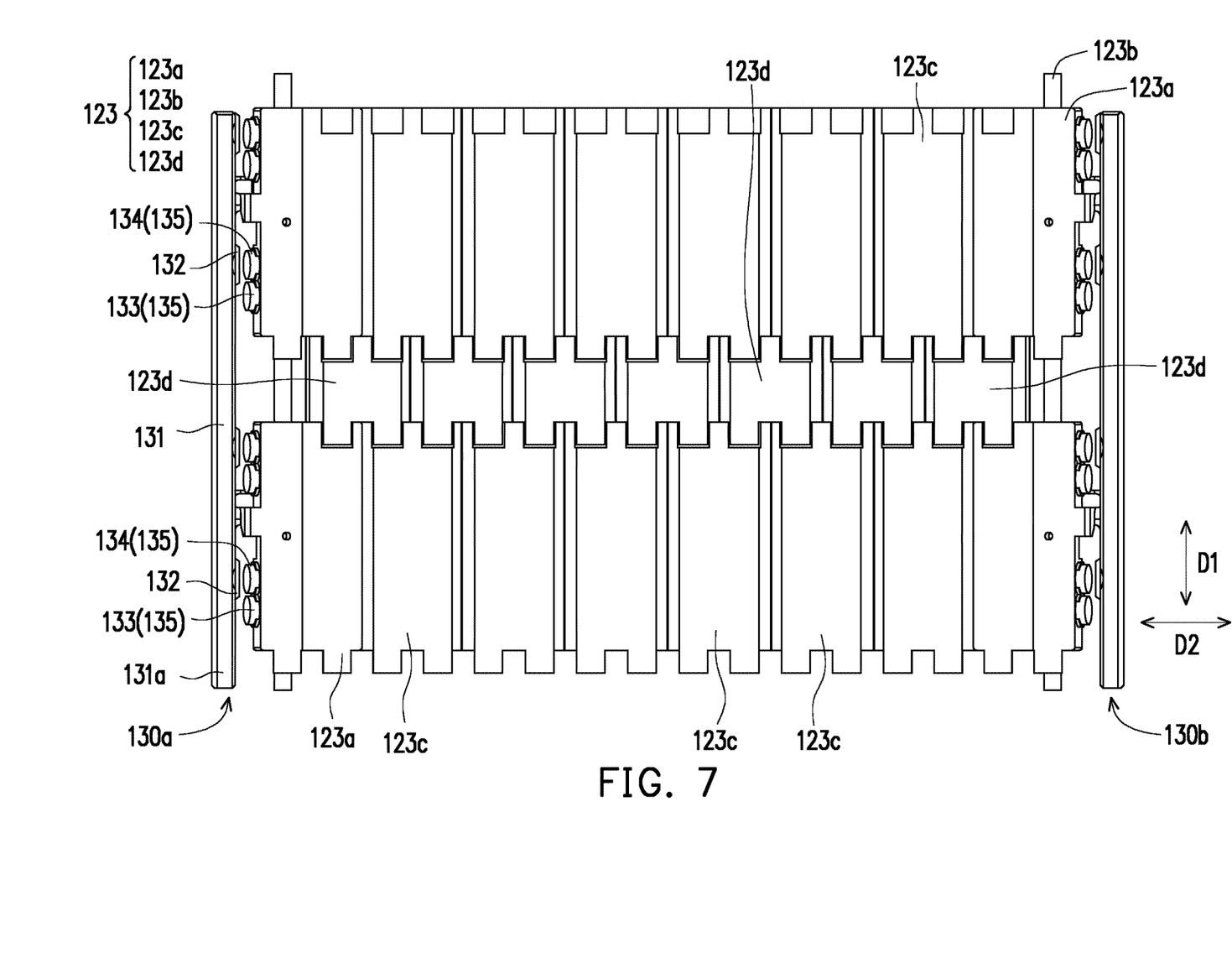
FIG. 7 is a schematic top diagram illustrating the supporting mechanism and the magnetic force mechanisms in the second state according to an embodiment of the invention.

FIG. 1 is a schematic diagram illustrating an electronic device in a first state according to an embodiment of the invention. FIG. 2 is a schematic diagram illustrating a second body in the first state according to an embodiment of the invention. FIG. 3 is a schematic front diagram illustrating a flexible display, a supporting mechanism and magnetic force mechanisms in the first state according to an embodiment of the invention. FIG. 4 is a schematic top diagram illustrating the supporting mechanism and the magnetic force mechanisms in the first state according to an embodiment of the invention. FIG. 5 is a schematic diagram illustrating an electronic device in a second state according to an embodiment of the invention. FIG. 6 is a schematic front diagram illustrating the flexible display, the supporting mechanism and the magnetic force mechanisms in the second state according to an embodiment of the invention. FIG. 7 is a schematic top diagram illustrating the supporting mechanism and the magnetic force mechanisms in the second state according to an embodiment of the invention.

Referring first to FIG. 1 and FIG. 5, in the present embodiment, an electronic device 100 may be a notebook computer, wherein the electronic device 100 includes a first body 110 and a second body 120, and the second body 120 is pivoted to the first body 110. FIG. 1 illustrates a state that the second body 120 is closed to the first body 110, and FIG. 5 illustrates a state after the second body 120 is expanded relative to the first body 110.

Specifically, the first body 110 is capable of computation processing and disposed with a keyboard set 111 and a touch pad 112. The second body 120 is capable of displaying, wherein the second body 120 includes a casing 121 and a flexible display 122, and the flexible display 122 is disposed in the casing 121. The casing 121 has a window area 121a for a user to view a display surface of the flexible display 122 through the window area 121a. Referring to FIG. 5 and FIG. 6, the display surface of the flexible display 122 is a curved surface, thereby providing the user with a surround field of vision and achieving a visual immersion effect for the user. Referring to FIG. 1 and FIG. 2, when the second body 120 is closed to the first body 110, the flexible display 122 keeps flat and unbent. In other words, a curvature of the flexible display 122 may vary with a state of the electronic device 100.

Since the curvature of the flexible display 122 is not fixed, the casing 121 does not have to be designed as an arc structure for fitting the curvature of the flexible display 122 and may meet the requirement for thin and lightweight design of the products. When the second body 120 is closed to the first body 110, the second body 120 may be closely attached to the first body 110, and thus, the issues that an overall thickness is overly great, and a structural strength is insufficient may be prevented from occurring to the electronic device 100. It should be specially mentioned that as long as the casing 121 has an internal space sufficient for the flexible display 122 receiving a force to be bent without causing any structural interference to the flexible display 122, the casing 121 may be maintained in a light and simple design.

Referring to FIG. 2 to FIG. 4, the second body 120 further includes a supporting mechanism 123 movably disposed in the casing 121, wherein the flexible display 122 is attached to the supporting mechanism 123, and the curvature of the flexible display 122 may vary with the state of the electronic device 100. As illustrated in FIG. 3, the supporting mechanism 123 is substantially presented in a flat structure, and the flexible display 122 is flatly unfolded in accordance with a geometric contour of the supporting mechanism 123. Referring to FIG. 6, the supporting mechanism 123 is substantially presented in an arc structure, and the flexible display 122 is bent in accordance with the geometric contour of the supporting mechanism 123.

Referring to FIG. 1 to FIG. 4, in the present embodiment, the electronic device 100 further includes a first magnetic force mechanism 130a and a second magnetic force mechanism 130b located in the casing 121, wherein the first magnetic force mechanism 130a and the second magnetic force mechanism 130b have the same composition and design principle, and the first magnetic force mechanism 130a and the second magnetic force mechanism 130b are disposed at the left and the right sides of the supporting mechanism 123. On the other hand, the first body 110 includes a first driving portion 113a and a second driving portion 11b, wherein the first driving portion 113a and the second driving portion 113b have the same structure design, and the first driving portion 113a and the second driving portion 113b protrude from the input operation surface 114 (i.e., the surface that the keyboard set 111 and the touch pad 112 are disposed). The first driving portion 113a is disposed corresponding to the first magnetic force mechanism 130a, and the second driving portion 113b is disposed corresponding to the second magnetic force mechanism 130b. In other embodiments, one from a combination of the first magnetic force mechanism 130a and the first driving portion 113a and a combination of the second magnetic force mechanism 130b and the second driving portion 113b may be selected to be disposed.

Because the first magnetic force mechanism 130a and the second magnetic force mechanism 130b have the same composition and design principle, and the first driving portion 113a and the second driving portion 113b have the same structure design. The combination of the first magnetic force mechanism 130a and the first driving portion 113a is selected for description below.

In the present embodiment, the first magnetic force mechanism 130a includes a sliding rod 131, a first magnet 132, a second magnet 133 and a third magnet 134, wherein the sliding rod 131 is slidably disposed at the casing 121, and the sliding rod 131 is configured to slide relative to the casing 121 along a first sliding direction D1. The first magnet 132 is disposed at the sliding rod 131 and faces the supporting mechanism 123, thereby sliding along with the sliding rod 131. The second magnet 133 and the third magnet 134 are disposed at the supporting mechanism 123 and face the sliding rod 131, and during the process that the first magnet 132 slides along with the sliding rod 131, the first magnet 132 may slide to pass a side of the second magnet 133 or the third magnet 134. Referring to FIG. 4, the first magnet 132 slides to be located aside the second magnet 133 and is aligned with the second magnet 133, and as illustrated in FIG. 7, the first magnet 132 may slide to be located aside the second magnet 134 and is aligned with the third magnet 134.

Referring to FIG. 1 and FIG. 5, the sliding rod 131 has a driven end 131a exposed from the casing 121, and the driven end 131a abuts against the first driving portion 113a. During the process that the electronic device 100 is transferred from the first state to the second state, the first driving portion 113a pushes the driven end 131a into the casing 121, such that the sliding rod 131 slides relative to the casing 121. When the first magnet 132 is aligned with the third magnet 134, the first magnet 132 generates a magnetic repulsion force to the third magnet 134, as illustrated in FIG. 7. In this circumstance, the first magnetic force mechanism 130a and the second magnetic force mechanism 130b respectively apply the magnetic repulsion force to left and right end portions of the supporting mechanism 123, causing the left end portion of the supporting mechanism 123 to move rightward and the right end portion of the supporting mechanism 123 to move leftward, so as to drive the supporting mechanism 123 to retract and bend, and the flexible display 122 is driven by the supporting mechanism 123 to be bent, as illustrated in FIG. 6 and FIG. 7.

Referring to FIG. 1 and FIG. 5, during the process that the electronic device 100 is transferred from the second state to the first state, the driven end 131a is moved out of the casing 121, such that the sliding rod 131 slides relative to the casing 121. When the first magnet 132 is aligned with the second magnet 133, the first magnet 132 generates a magnetic attraction force to the second magnet 133, as illustrated in FIG. 4. In this circumstance, the first magnetic force mechanism 130a and the second magnetic force mechanism 130b respectively apply the magnetic attraction force to the left and the right end portions of the supporting mechanism 123, causing the left end portion of the supporting mechanism 123 to move leftward and the right end portion of the supporting mechanism 123 to move rightward, so as to drive the supporting mechanism 123 to tension and flatly unfold, and the flexible display 122 is driven by the supporting mechanism 123 to be tensioned and flatly unfolded, as illustrated in FIG. 3 and FIG. 4.

That is to say, the force applied by the first magnetic force mechanism 130a and the second magnetic force mechanism 130b to the flexible display 122 can be transferred through the relative rotation of the second body 120 and the first body 110. Thus, for the user, the operation of the electronic device 100 of the invention becomes more convenient.

Furthermore, during the process that the second body 120 rotates relative to the first body 110, the sliding rod 131 abuts against different sections on the first driving portion 113a, and based on the change of the geometric contour of the first driving portion 113a, an extent that the driven end 131a is pushed into the casing 121 may vary. The driving portion 113a has a straight-line section 115, a turning section 116 and a cam section 117, wherein the straight-line section 115 is connected with the input operation surface 114, and the turning section 116 is located between the straight-line section 115 and the cam section 117. When the driven end 131a of the sliding rod 131 abuts against the straight-line section 115, the driven end 131a is not pushed into the casing 121, and in a condition that the sliding rod 131 does not slide relative to the casing 121, the first magnet 132 is aligned with the second magnet 133, as illustrated in FIG. 1 and FIG. 4. When the driven end 131a of the sliding rod 131 is moved and passes the straight-line section 116, the driven end 131a starts to be pushed into the casing 121, causing the sliding rod 131 to slide relative to the casing 121. When the driven end 131a of the sliding rod 131 is moved to (or abuts against) the cam section 117, the first magnet 132 is aligned with the third magnet 134, as illustrated in FIG. 5 and FIG. 7.

During the process that the electronic device 100 is transferred from the second state to the first state, in order to ensure that the first magnet 132 slides along with the sliding rod 131 and is again aligned with the second magnet 133, the magnetic attraction force generated by the first magnet 132 to the second magnet 133 may be designed as being greater than the magnetic repulsion force generated by the first magnet 132 to the third magnet 134, thereby driving the sliding rod 131 to return back. Based on the abutting relationship between the sliding rod 131 and the first driving portion 113a, the state that the first magnet 132 is aligned with the third magnet 134 is not influenced by the aforementioned magnetic force design.

Referring to FIG. 1 and FIG. 5, the casing 121 has a side 121b facing the first driving portion 113a and the second driving portion 113b and a pivoting portion 121c protruding from the side 121b. The electronic device 100 further includes a rotation shaft 140, wherein the pivoting portion 121c is located between the first driving portion 113a and the second driving portion 113b, and the rotation shaft 140 is inserted in the first driving portion 113a, the second driving portion 113b and the pivoting portion 121c. On the other hand, the casing 121 further has openings 121d (illustrated as two openings) located at the side 121b for the driven end 131a of the sliding rod 131 to move into or out of the casing 121.

Referring to FIG. 4 and FIG. 7, taking the first magnetic force mechanism 130a as an example for description, the number of the first magnets 132 may be plural, and the first magnets 132 are arranged on the sliding rod 131 along the first sliding direction D1. The numbers of the second magnets 133 and the third magnets 134 may plural, wherein the second magnets 133 and the third magnets 134 are alternately arranged along the first sliding direction D1 and the numbers of the first magnets 132, the second magnets 133 and the third magnets 134 are the same. For example, one of the second magnets 133 and one of the third magnets 134 that are adjacent to each other may constitute a magnet set 135, and each magnet set 135 is disposed corresponding to one of the first magnets 132. Referring to FIG. 1 and FIG. 4, for each magnet set 135, the second magnet 133 is located between the driving portion 113a and the third magnet 134 in the first sliding direction D1.

Referring to FIG. 2 to FIG. 4, in the present embodiment, the supporting mechanism 123 includes at least two side supporting blocks 123a, two movable rods 123b and a plurality of intermediate supporting blocks 123c, wherein each of the side supporting blocks 123a is disposed with at least one magnet set 135 (including one of the second magnets 133 and one of the third magnets 134), and each of the movable rods 123b passes through one of the side supporting blocks 123a and is slidably disposed in the casing 121. Each of the movable rods 123b is configured to slide relative to the casing 121 along a second sliding direction D2, and the first sliding direction D1 is perpendicular to the second sliding direction D2.

Referring to FIG. 3 and FIG. 4, the supporting mechanism 123 is tensioned and flatly unfolded, and a first distance L1 is maintained between the two movable rods 123b. Referring to FIG. 6 and FIG. 7, the supporting mechanism 123 is retracted and curved, and a second distance L2 is maintained between the two movable rods 123b. During the process that the electronic device 100 is transferred from the first state to the second state, the two movable rods 123b slide close to each other. On the other hand, during the process that the electronic device 100 is transferred from the second state to the first state, the two movable rods 123b slide away from each other. Thus, the first distance L1 is greater than the second distance L2.

On the other hand, the intermediate supporting blocks 123c are arranged side by side between the two side supporting blocks 123a, wherein the intermediate supporting blocks 123c are connected with each other, and at least two of the intermediate supporting blocks are respectively connected with the two side supporting blocks 123a. Two adjacent intermediate supporting blocks 123c have a degree of motion freedom for relative rotation, and one of the side supporting blocks 123a and one of the intermediate supporting blocks 123c that are adjacent to each other have a degree of motion freedom for relative rotation. During the process that the electronic device 100 is transferred from the first state to the second state, the two movable rods 123b slide close to each other, and the two side supporting blocks 123a are driven by the two movable rods 123b to push the intermediate supporting blocks 123c, such that the supporting mechanism 123 is retracted and bent. On the other hand, during the process that the electronic device 100 is transferred from the second state to the first state, the two movable rods 123b slide away from each other, and the two side supporting blocks 123a are driven by the two movable rods 123b to pull the intermediate supporting blocks 123c, such that the supporting mechanism 123 is tensioned and flatly unfolded.

In the present embodiment, the supporting mechanism 123 further includes a plurality of connecting blocks 123d arranged side by side between the two side supporting blocks 123a, two adjacent intermediate supporting blocks 123c are connected with each other through one of the connecting blocks 123d, and one of the side supporting blocks 123a and one of the intermediate supporting blocks 123c that are adjacent to each other are connected with each other through one of the connecting blocks 123d. One of the intermediate supporting block 123c and one of the connecting blocks 123d that are connected with each other have a degree of motion freedom for relative rotation, and one of the side supporting blocks 123a and one of the connecting blocks 123d that are connected with each other have a degree of motion freedom for relative rotation.

For example, the number of the side supporting blocks 123a may be four, any two of the side supporting blocks 123a are arranged along the first sliding direction D1 and disposed in a group, and one of the movable rods 123b passes through the side supporting blocks 123a that are grouped. In the second sliding direction D2, a plurality of intermediate supporting blocks 123c are arranged between one of the side supporting blocks 123a and another one of the side supporting blocks 123a that are opposite to each other and are arranged in a row. One of the side supporting blocks 123a and one of the intermediate supporting blocks 123c that are adjacent to each other are connected with each other through one of the connecting blocks 123d, and two adjacent intermediate supporting blocks 123c are connected with each other through one of the connecting blocks 123d. In the second sliding direction D2, a plurality of connecting blocks 123d are arranged in a row. In the first sliding direction D1, a plurality of connecting blocks 123d are clipped between one of the side supporting blocks 123a, a plurality of intermediate supporting blocks and the other side supporting block 123a that are arranged in one row and one of the side supporting blocks 123a, a plurality of intermediate supporting blocks and the other side supporting block 123a that are arranged in another row.

Based on the above, the electronic device of the invention can generate the magnetic attraction force to the flexible display through the magnetic force mechanism, so as to flatly unfold the flexible display, or alternatively, the electronic device of the invention can generate the magnetic repulsion force to the flexible display through the magnetic force mechanism, so as to bend the flexible display. Since the curvature of the flexible display is not fixed, the casing of the second body can be in accordance with the curvature of the flexible display without having to be designed as an arc structure and can meet the requirement for thin and lightweight design of the products. When the second body is closed to the first body, the second body can be closely attached to the first body, and thus, the issues that an overall thickness is overly great, and a structural strength is insufficient can be prevented from occurring to the electronic device. The force applied by the magnetic force mechanism to the flexible display can be transferred through the relative rotation of the second body and the first body. Thus, for the user, the operation of the electronic device of the invention becomes more convenient. On the other hand, the flexible display after being bent can provide the user with the surround field of vision, so as to achieve the visual immersion effect for the users.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electronic device, comprising:
a first body, comprising a driving portion;
a second body, pivoted to the first body, wherein the second body comprises a casing, a flexible display and a supporting mechanism, the supporting mechanism is movably disposed in the casing, and the flexible display is attached to the supporting mechanism; and
a magnetic force mechanism, disposed in the casing, wherein a portion of the magnetic force mechanism is exposed from the casing and abuts against the driving portion, the magnetic force mechanism is magnetically coupled to the supporting mechanism, wherein the magnetic force mechanism generates a magnetic attraction force or a magnetic repulsion force to the supporting mechanism by the second body rotating relative to the first body.

2. The electronic device according to claim 1, further comprising:
a magnetic force mechanism, comprising a sliding rod, a first magnet, a second magnet and a third magnet, wherein the sliding rod is slidably disposed at the casing, the first magnet is disposed at the sliding rod and faces the supporting mechanism, the second magnet and the third magnet are disposed at the supporting mechanism and face the sliding rod, and the sliding rod has a driven end exposed from the casing and abuts against the driving portion, wherein the first magnet is aligned with the second magnet to generate a magnetic attraction force to the second magnet, and the first magnet is aligned with the third magnet to generate a magnetic repulsion force to the third magnet.

3. The electronic device according to claim 2, wherein the number of the driving portions is two, the number of the magnetic force mechanisms is two, the two magnetic force mechanisms are disposed at two sides of the supporting mechanism, and each of the driving portions abuts against the driven end of the sliding rod of one of the magnetic force mechanisms.

4. The electronic device according to claim 3, wherein the supporting mechanism comprises at least two side supporting blocks, two movable rods and a plurality of intermediate supporting blocks, each of the side supporting blocks is disposed with the second magnet and the third magnet of one of the magnetic force mechanisms, each of the movable rods passes through one of the side supporting blocks and is slidably disposed in the casing, the intermediate supporting blocks are arranged side by side between the two side supporting blocks, the intermediate supporting blocks are connected with each other, and at least two of the intermediate supporting blocks are connected with the two side supporting blocks.

5. The electronic device according to claim 4, wherein the sliding rod of each of the magnetic force mechanisms is configured to slide relative to the casing along a first sliding direction, and each of the movable rods is configured to slide relative to the casing along a second sliding direction, wherein the first sliding direction is perpendicular to the second sliding direction.

6. The electronic device according to claim 4, wherein the supporting mechanism further comprises a plurality of connecting blocks arranged side by side between the two side supporting blocks,
  one of the side supporting blocks and one of the intermediate supporting blocks that are adjacent to each other are connected with each other through one of the connecting blocks, and
  two of the intermediate supporting blocks that are adjacent to each other are connected with each other through one of the connecting blocks.

7. The electronic device according to claim 2, wherein the sliding rod is configured to slide relative to the casing along a sliding direction, and in the sliding direction, the second magnet is located between the third magnet and the driving portion.

8. The electronic device according to claim 2, wherein the casing has a side facing the driving portion and a pivoting portion protruding from the side, the electronic device comprises a rotation shaft, and the rotation shaft is inserted in the driving portion and the pivoting portion.

9. The electronic device according to claim 8, wherein the casing further has an opening located at the side, and the driven end of the sliding rod moves into or out of the casing through the opening.

10. The electronic device according to claim 2, wherein the first body has an input operation surface, and the driving portion protrudes from the input operation surface.

11. The electronic device according to claim 10, wherein the driving portion has a straight-line section, a turning section and a cam section, the straight-line section is connected with the input operation surface, the turning section is located between the straight-line section and the cam section, and the driven end of the sliding rod abuts against the straight-line section, and the first magnet is aligned with the second magnet, or the driven end of the sliding rod abuts against the cam section, and the first magnet is aligned with the third magnet.

* * * * *